(12) United States Patent
Burnstein

(10) Patent No.: US 6,485,059 B2
(45) Date of Patent: Nov. 26, 2002

(54) DETACHABLE MUD FLAP ASSEMBLY FOR VEHICLES

(76) Inventor: Brent L. Burnstein, 5743 W. Bethany Home Rd., Glendale, AZ (US) 85311

( * ) Notice: Subject to any disclaimer, the term of this patent is extended or adjusted under 35 U.S.C. 154(b) by 0 days.

(21) Appl. No.: 09/792,713

(22) Filed: Feb. 23, 2001

(65) Prior Publication Data

US 2001/0030407 A1 Oct. 18, 2001

Related U.S. Application Data

(60) Provisional application No. 60/184,618, filed on Feb. 24, 2000.

(51) Int. Cl.$^7$ ................................................ B62B 9/14
(52) U.S. Cl. ............................................ 280/851
(58) Field of Search ........................... 280/154, 851, 280/852, 491.5, 155, 847, 152.2, 152.3, 848; D12/185

(56) References Cited

U.S. PATENT DOCUMENTS

| | | | | |
|---|---|---|---|---|
| 4,319,764 A | * | 3/1982 | Whitaker | 280/154 |
| 4,377,294 A | * | 3/1983 | Lockwood et al. | 280/851 |
| 4,541,646 A | * | 9/1985 | Knowley | 280/851 |
| 5,121,944 A | * | 6/1992 | Haddox | 280/848 |
| D328,447 S | * | 8/1992 | Ahleen | D12/185 |
| D330,692 S | * | 11/1992 | Hammond, Jr. | D12/185 |
| 5,181,734 A | * | 1/1993 | Brown | 280/851 X |
| 5,833,254 A | * | 11/1998 | Bucho | 280/154 |
| 5,853,187 A | * | 12/1998 | Maier | 280/495 |
| 6,076,842 A | * | 6/2000 | Knoer | 280/154 |
| 6,152,469 A | * | 11/2000 | Gadowski | 280/154 |
| 6,179,311 B1 | * | 1/2001 | Larkin et al. | 280/154 |
| 6,375,223 B1 | * | 4/2002 | Kirckof | 280/851 |

* cited by examiner

Primary Examiner—Brian L. Johnson
Assistant Examiner—Bryan Fischmann
(74) Attorney, Agent, or Firm—Gregory J. Nelson

(57) ABSTRACT

A detachable mud flap assembly securable to a trailer hitch assembly. The hitch and receiver each define a transverse bore. Mud flap mounting arms have tubular inner ends which are joined by a connector. Removably pins adjacent the receiver extend though holes in registry in the arm and connector to secure the assembly. In an alternate embodiment, extension mud flap arms may be secured to the ends of the mounting bars.

3 Claims, 2 Drawing Sheets

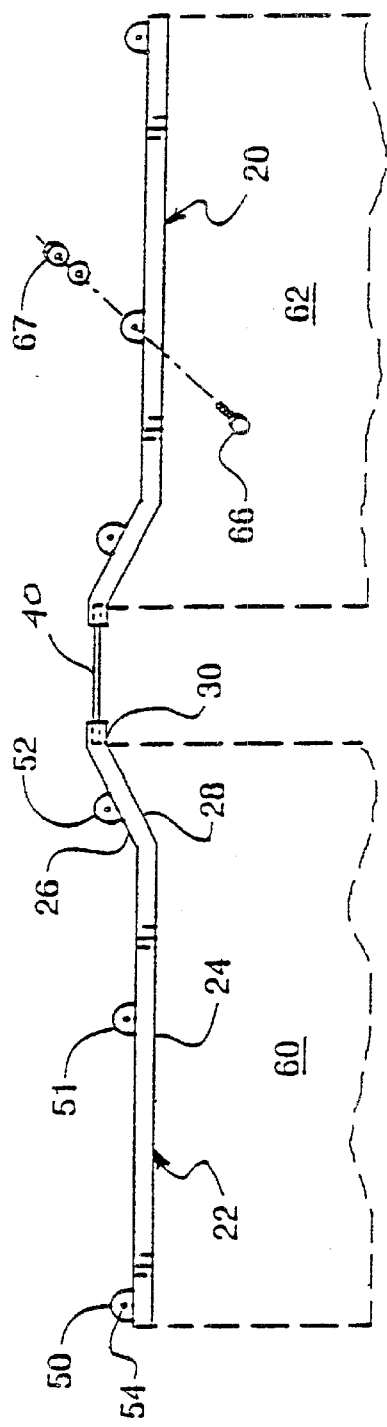
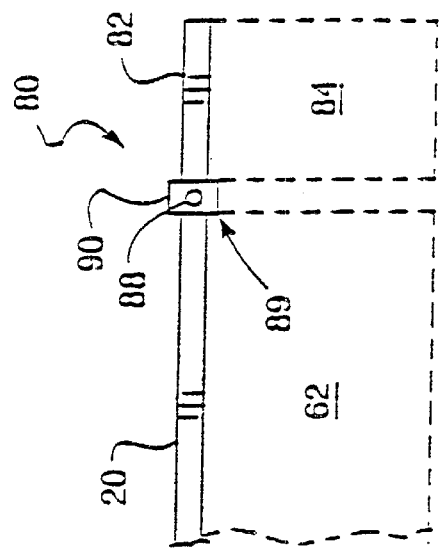
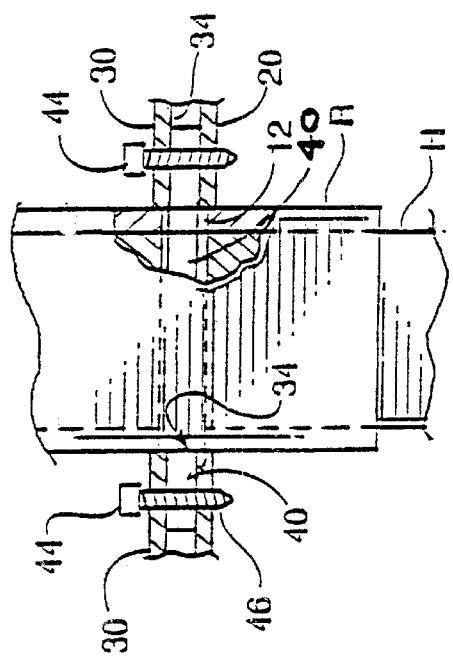
FIG. 3.
FIG. 5.
FIG. 4.

DETACHABLE MUD FLAP ASSEMBLY FOR VEHICLES

This application is based on provisional patent application Ser. No. 60/184,618, filed Feb. 24, 2000, entitled "Detachable Mud Flap Assembly For Vehicles."

FIELD OF THE INVENTION

The present invention relates to vehicle mud flaps and more particularly relates to a detachable mud flap assembly which may be secured to the vehicle trailer hitch.

BACKGROUND OF THE INVENTION

Mud flaps are commonly attached to vehicles behind the rear wheels to deflect rocks, stones and debris propelled rearwardly by the wheels. The purpose of mud flaps is both to protect the vehicle and also protect vehicles and persons behind the mud flap equipped vehicle from being struck by such debris. Generally mud flaps are permanently mounted to the vehicle particularly in the instance of larger commercial trucks.

While mud flaps serve to protect the vehicle by deflecting debris, many drivers of vehicles, particularly smaller trucks, object to having the mud flaps attached at all times because they detract from the appearance of the vehicle and further mud flaps can be torn or dislodged particularly when the vehicle is placed in reverse.

Accordingly, there exists a need for a detachable mud flap assembly which can be attached to a vehicle when necessary such as when driving conditions present the possibility that gravel, mud and debris may be rearwardly thrown from the tires. Further, mud flaps may also be used when a vehicle is towing a trailer, or other vehicle such as a boat and the vehicle driver wishes to protect the towed vehicle from such flying debris.

Several mud flap assemblies can be found in the prior art. U.S. Pat. No. 4,572,532 shows a mud flap holder assembly adapted to be secured to a vehicle proximate the rear tire and wheel. The assembly includes a first bar which is secured to the vehicle and a second bar secured to the first bar by clamp members whereby the second bar may be clamped against the first bar for clamping the mud flap therebetween and which may be released from the clamped position for removal or replacement of the mud flap.

U.S. Pat. No. 5,121,944 describes an adjustable mud flap assembly which utilizes the transverse bar member of a trailer hitch assembly as the main support for the mud flaps. The mud flap assembly has a pair of right and left frame members which are removably attached to the ends of the transverse bar member. Each L-shaped mud flap frame generally has a rectangular mud flap removably attached thereto. By varying the radial disposition of the L-shaped mud flap frame member with respect to the transverse bar member, the position of the mud flap with respect to the vehicle can be changed. Utilizing the transverse bar member of the hitch assembly as a support base for the mud flap assembly requires that the mud flaps be positioned at the rear of the vehicle. This disposes mud flaps in the trajectory path of any projectile.

BRIEF SUMMARY OF THE INVENTION

Briefly, the present invention provides a detachable mud flap assembly which is securable to the trailer hitch assembly which is normally located at a mid-point along the rear bumper. The hitch and the receiver each define aligned transverse holes which receive the opposing extending mud flap mounting arms. The mud flap mounting arms are each elongated and extend oppositely from the hitch assembly. Preferably, the hitch arms each have an offset section at their inner end to provide clearance for exhaust pipes or electrical connections. A connector extends through the aligned holes in the hitch assembly and is secured to the inner ends of the arms. The connector is pinned or otherwise secured to the arms. A flexible mud flap of rubber or other material is secured to each of the arms by bolts or fasteners secured to tabs extending from the arms. The mud flap and the arms may be trimmed to conform to the width and height of the vehicle. In another embodiment, extensions may be secured to the ends of the arms to provide length to the arms for extra wide vehicles such as RVs and those having dual rear wheels.

BRIEF DESCRIPTION OF THE DRAWINGS

The above and other objects and advantages of the invention will be more fully understood from the following description and drawings in which:

FIG. 3 is a rear view of the assembly;

FIG. 4 is a cross sectional detail view of the hitch and connector; and

FIG. 5 shows an alternate embodiment of the present invention which an extender arm may be attached to the ends of the mud flap arms to achieve greater transverse widths.

DETAILED DESCRIPTION OF THE DRAWINGS

Figure 1:
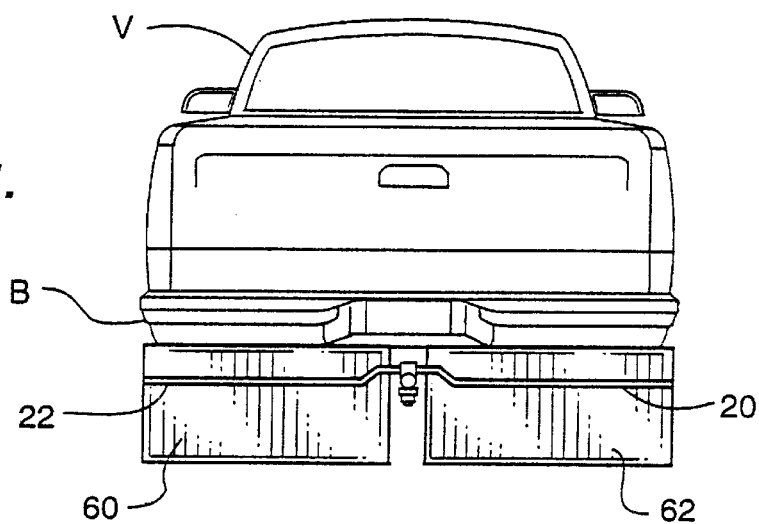
FIG. 1 is a rear view of vehicle equipped with a detachable mud flap assembly according to the present invention.

Turning now to the drawings in FIGS. 1 to 4, the present invention is shown comprising a universal mud flap assembly 10 which may be detachably secured to vehicles V of various sizes and types. The mud flap assembly is generally designated by the numeral 10 and may be secured to a vehicle V of the type having a rear bumper B. The rear bumper B supports a conventional trailer hitch assembly having a receiver R and a hitch member H which is insertable within the receiver. As is conventional, the hitch assembly carries a ball or other connector which may be secured to the tongue of a towed vehicle.

The receiver R and hitch H, when engaged, each define a transverse bore 12 which extends through the entire hitch assembly as seen in FIG. 4. The bore is positioned at a location below the bumper B and provides a mounting location for the mud flap assembly 10 of the present invention.

The mud flap assembly 10 comprises a pair of oppositely extending mounting arms 20 and 22. Each of the arms has a generally linear section 24 and an offset section 26 at its inner end. The offset section in the installed position has an upwardly angularly extending section 28 and horizontal section 30. The horizontal section 30 is preferably tubular and defines an interior bore 34. The overall length of each of the mounting arms may vary but typically each would be approximately 36 inches in length and may be trimmed to a lesser dimension if required.

A connector 40 is inserted through the bore 12 extending through the receiver and hitch. The connector 40 is a pin structure having a length greater than the overall width of the hitch so that the connector oppositely extends from the opposite sides of the receiver as shown in FIG. 4. The inner ends of the arms 20, 22 can then be inserted over the projecting ends of the connector 40 and a fastener such as a pin 44 can be dropped into place in the aligned bores 46 in the inner ends of the arms and the connector 40. It will be seen that the inner end of the arms 20, 22 abut the sides of the receiver R so that once the pins are in place, the assembly is secure. However, the mud flap assembly can easily removed by simply withdrawing the pins 44 and removing the arms and the connector.

As seen in FIG. 3, the arms each carry a plurality of tabs 50, 51 and 52 which are secured to the arms and project from the arms. The tabs each define a bore 54. The mud flaps 60, 62 are each shown as being generally rectangular panels made of rubber or other flexible material. Again, the dimensions of the mud flap may vary in accordance with the requirements of the user. The flaps are secured to the arms by fasteners such as bolts 66 extending through the tabs and mud flaps and are secured at their opposite ends by a washer and nut 67. In the event the mud flap becomes torn or damaged, it is a relatively easy matter to remove the mud flap and replace it with another flap.

Figure 2:
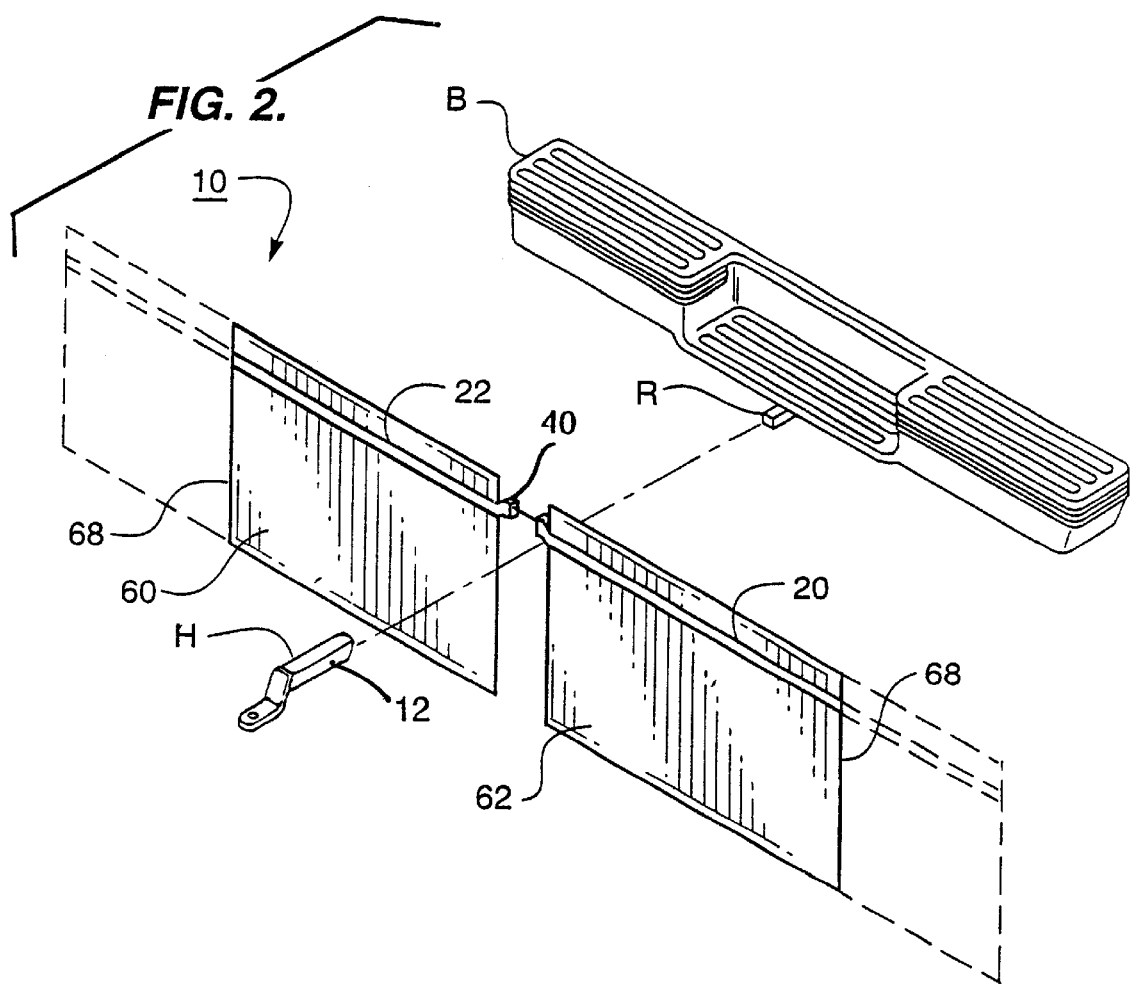
FIG. 2 is an exploded view showing a preferred embodiment of the mud assembly of the present invention in conjunction with a rear bumper.

Further, if necessary, both the arms 20, 22 and mud flaps 60, 62 can be trimmed to desired width as shown in FIG. 2. This can be easily accomplished by cutting the outer vertical edge of the mud flap and also cutting through the arms 20, 22 at lines 68 with a hack saw or other similar tool.

It will be seen that it is a relatively easy manner to install the detachable mud flap assembly when the mud flap is required as for example when towing a boat or trailer. This is accomplished by placing the connector 40 in the hitch and inserting the opposite inner ends of the arms 20, 22 over the projecting ends of the connector. The locking pins 44 are then put in position and the mud flap assembly is ready for use. Detachment is easily accomplished by removing the pins 44 and removing the flap supporting mounting bars and the connector.

FIG. 5 shows an alternating embodiment which the mud flap assembly which has been described above is further provided with extender 80. The extenders each consist of rod 82 of predetermined length. A flexible mud flap 84 is attached to the extender rod 82. The inner end of the extender rod includes a coupling 90 which has a bore 89 adapted to be secured over the outer end of the associated mounting arm 20. The coupling can be secured to the arm by inserting a pin 88 through the coupling and into the outer end of the arm. Alternatively, the outer projecting end of the arm 20 can be threaded and the coupling internally threaded and be secured in place by a simple turning operation. Thus, if a vehicle owner has several vehicles of varying width and which the owner wishes to use the mud flap assembly, the assembly can be easily modified to a desired width by simply attaching the extenders or removing the extenders as necessary. The attachment of the arms at their inner end to the hitch assembly is as has been described.

It will be obvious to those skilled in the art to make various changes, alterations and modifications to the invention described herein. To the extent these various changes, alterations and modifications do not depart from the spirit and scope of the disclosure, they are clearly intended to be encompassed therein.

I claim:

1. A vehicle mud flap assembly securable to a hitch assembly of the type defining a transverse bore having a length, said mud flap assembly comprising (a) a pair of mounting arms each having an outer end and a generally tubular inner end;

(b) a tubular connector insertable in said bore having a length greater than the length of the bore, said tubular connector defining apertures at opposite ends thereof, said inner ends of said mounting arms being receivable in said tubular connectors to extend from opposite sides of said hitch, said inner ends of said arms having holes in registry with said apertures;

(c) removable fastener means insertable in said apertures and holes at opposite sides of the hitch assembly; and (d) mud flap panels mounted on said arms.

2. The mud flap assembly of claim 1 wherein said mounting arms each have an offset section at their inner ends to provide clearance for a vehicle component.

3. The mud flap assembly of claim 1 further including extender arm detachably securable to the outer ends of said arms, said extender arms carrying second mud flap panels.

* * * * *